United States Patent [19]
O'Brien et al.

[11] 3,901,525
[45] Aug. 26, 1975

[54] SKI CONSTRUCTION FOR VEHICLES

[76] Inventors: Roy E. O'Brien, 17834 Millar Rd., Mt. Clemens, Mich. 48043; Donald J. Leslie, 1310 N. Washington, Apt. No. 11, Royal Oak, Mich. 48067; Michael R. Leslie, 1947 Robina Ave., Berkley, Mich. 48072

[22] Filed: Nov. 1, 1974

[21] Appl. No.: 519,802

Related U.S. Application Data

[62] Division of Ser. No. 324,205, Jan. 16, 1973, Pat. No. 3,845,967.

[52] U.S. Cl. ................................. 280/14; 180/5 A
[51] Int. Cl.² ......................................... B62B 19/04
[58] Field of Search ......... 280/14, 13, 28, 12 R, 16, 280/21 R; 9/310 B

[56] References Cited
UNITED STATES PATENTS
| | | | |
|---|---|---|---|
| 3,649,040 | 3/1972 | Snider | 280/14 |
| 3,756,615 | 9/1973 | Bray | 280/14 |

*Primary Examiner*—Robert R. Song
*Attorney, Agent, or Firm*—Whittemore, Hulbert & Belknap

[57] ABSTRACT

A ski construction is provided for mounting on the front axle of a normally wheeled vehicle to convert the wheeled vehicle into a snowmobile-like vehicle.

9 Claims, 8 Drawing Figures

PATENTED AUG 26 1975 3,901,525

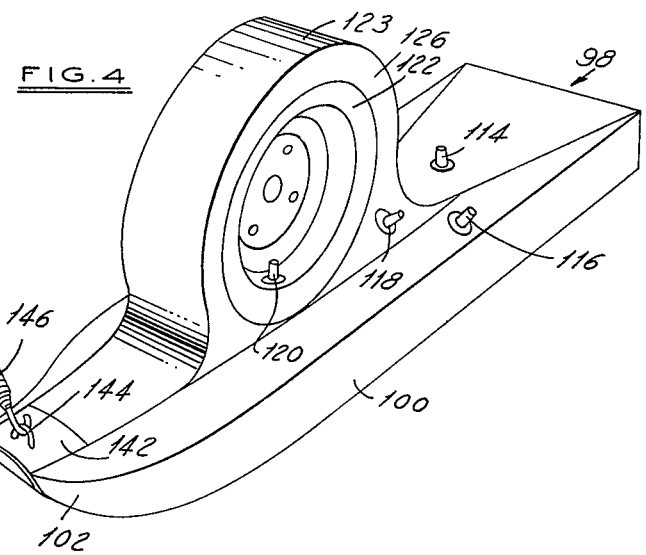
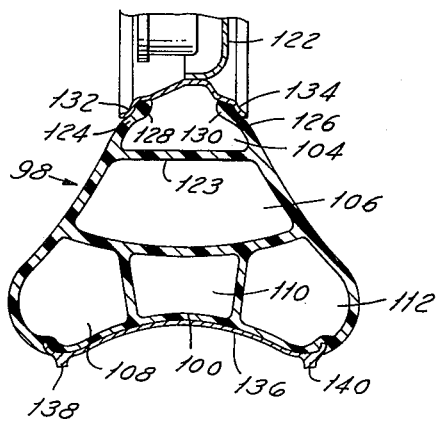

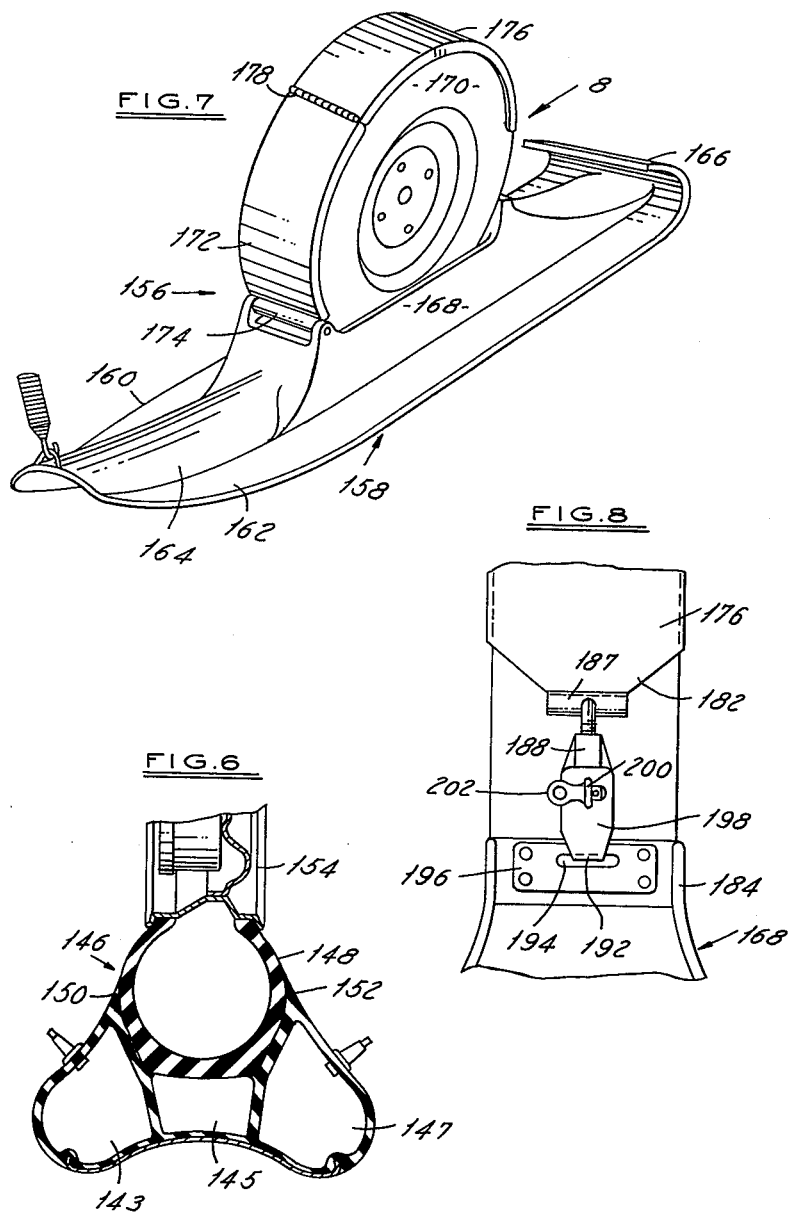

SKI CONSTRUCTION FOR VEHICLES

CROSS-REFERENCE TO RELATED APPLICATION

This application is a division of our pending application, Ser. No. 324,205, filed Jan. 16, 1973 now U.S. Pat. No. 3,845,967.

BACKGROUND OF THE INVENTION

Snowmobiles have come into widespread popularity in recent years. Snowmobiles permit travelling off-the-road during the winter months. It would be desirable to provide means for converting a conventional wheeled automobile, truck, aircraft, trailer, tractor, bus, bicycle or motorcycle, and like vehicles to a construction similar to a snowmobile to permit use of such vehicles off-the-road in the winter months and to further facilitate use of such vehicles on ordinary roadways which become snow covered in the winter. It is not difficult to provide an endless track system for vehicles which have a rear wheel drive. However, conversion of the front axle structure from adaptability to ordinary wheels to skis presents a problem in that no conventional ski construction is known to be commercially available for this purpose. The present invention provides such a ski construction useful for the desired conversion.

SUMMARY OF THE INVENTION

A ski construction is provided for the front end of a vehicle. The ski construction comprises a ground engageable ski element. The ski element includes means for attachment to a front axle hub of a vehicle. The ski element has a forward nose portion. A tension spring is secured at one end to the nose portion. Means are provided for securing the other end of the spring to structure of a vehicle at a position above the ski element to apply a generally vertical force component to the nose portion to maintain the nose portion in an upwardly directed attitude and to inhibit the turning radius of the vehicle steering system.

IN THE DRAWINGS

FIG. 4 is a view in perspective of an inflatable ski structure forming another embodiment of the invention;

FIG. 5 is a cross-sectional view taken through the center of the ski structure of FIG. 4;

FIG. 6 is a view in cross-section of an inflatable ski structure forming another embodiment of the invention;

FIG. 7 is a view in perspective of another embodiment of a ski structure; and

FIG. 8 is a partial view of the rear portion of the ski structure of FIG. 6 looking in the direction of arrow 8 and illustrating the latch structure which is utilized to retain a vehicle wheel on the ski structure.

Figure 1:
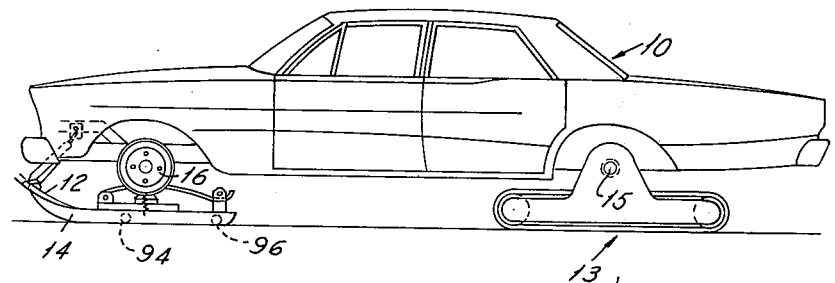
FIG. 1 is a side elevational view of an automobile modified in accordance with one embodiment of the invention by providing an endless belt drive structure on the rear driving axle of the vehicle and providing a ski structure on the front axle.
Figure 2:
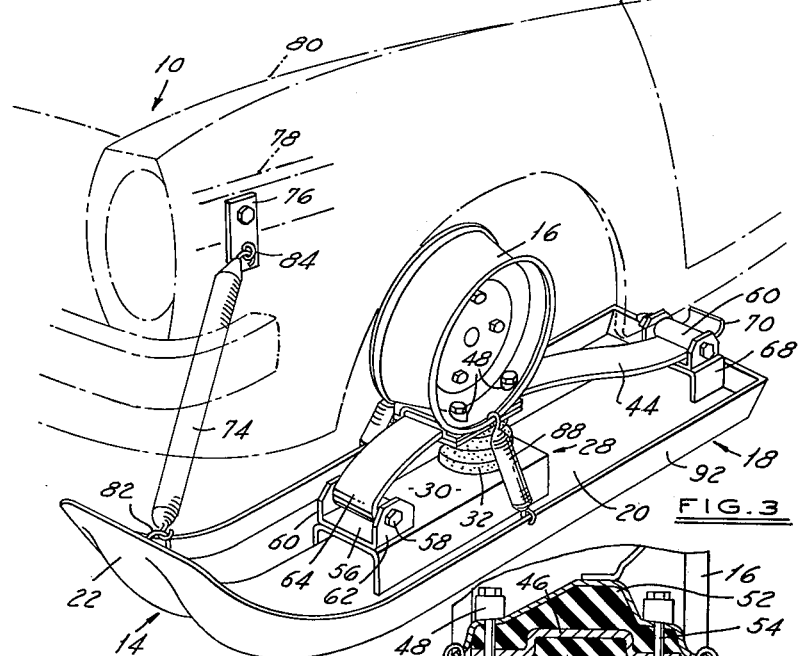
FIG. 2 is an enlarged view in perspective of the ski structure provided on the front left wheel assembly of FIG. 1.
Figure 3:
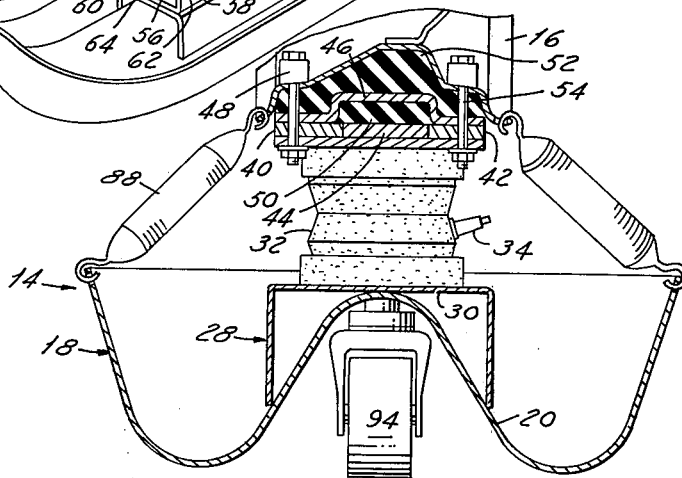
FIG. 3 is a sectional view taken through the center portion of the ski structure of FIG. 2.

Referring first to the embodiment illustrated in FIGS. 1–3, it will be noted that a conventional automobile 10 has been converted to a snowmobile-type vehicle by the provision of a pair of ski structures 12, 14 on the front wheels in place of the usual tires. An endless track structure 13 has been mounted on the rear driving axle 15 in place of the usual rear wheels. The track structure 13 is operatively connected to the vehicle drive by means of suitable gearing. The automobile 10 may thus be driven over snow or mud in the manner of a snowmobile. Steering is effectuated in the usual manner of an automobile, it being noted that the ski structures 12, 14 are directly connected to the wheel rims of the automobile.

The left ski structure 14 is illustrated in FIGS. 2 and 3. The right ski structure 12 is identical. The ski structure 14 comprises a ski element 18 fabricated from sheet metal or molded re-inforced plastic. The ski element 18 has a bottom portion 20 and an upturned forward nose 22. The bottom portion 20 has a W-shaped configuration when viewed in cross-section as in FIG. 3 to provide a pair of ground engaging protuberances which function as individual ski structures. An inverted U-shaped support bracket 28 is mounted centrally of the bottom portion 20 and secured in place as by welding. The web of the bracket 28 defines a support platform 30 upon which is mounted an inflatable air bag 32. The bag 32 may be inflated to different pressures by means of valve 34. The bag 32 is fabricated of flexible material such as rubber-impregnated fabric of a sheet elastomer.

A conventional wheel rim 16 is mounted on the air bag 32. As will be noted, a metal plate 38 is secured to the upper end of the bag 32. An elongated metal bar 40, 42, is positioned along each longitudinal marginal edge of the plate 38 leaving a space therebetween for reception of a leaf spring 44. A second plate structure 46 is positioned atop the bars 40, 42. The center portion of the plate 46 is deformed upwardly to define a U-shaped configuration. An elastomeric material 50, such as polyurethane, fills the space defined by this portion to thus provide a resilient backing for the spring 44 permitting some deformation or buckling of the spring in the area of the plate during use. The wheel rim 16 is spaced from the upper surface of the plate 46 by means of elastomeric material 52 which is molded in place. Bosses 48 are provided in wheel rim 16 for added strength and suitable openings are provided through the various components for insertion of the shanks of nut and bolt structures 54 to thereby firmly secure the rim 16 in place.

A U-shaped spring bracket 56 is secured on the forward top surface of the platform 30 as by welding. A nut and bolt structure 58 extends through upstanding bracket walls 60, 62. One end 64 of the leaf spring 44 is curled to define a central passageway through which the shank of the nut and bolt structure 58 extends to thereby pivotally secure one end of the spring firmly in place. The other end of the spring 44 extends beneath a roller 66 provided on a rear spring bracket structure 68. The end 70 of the spring is bent upwardly to prevent disengagement of the spring from the bracket structure 68. The bracket structure 68 permits the end of the spring to move in and out during flexing of the spring.

The spring 44 together with the air bag 32 provide vertical spring support for the front wheel thus permitting up and down movement thereof. The degree of inflation of the air bag 32 may be varied to thereby vary the height to which the rim 16 is elevated and also the stiffness of the combined spring structure. While an inflatable bag 32 is preferred, an elastomeric block may be used in its place.

Additionally, a stack of spring leafs may be used instead of the single spring leaf illustrated. The air bag 32 also serves as a damper.

An elongated tension coil spring 74 extends from the ski nose 22 to a bracket 76 which is bolted to the vehicle chassis 78 underneath the fender 80. The ends of the spring 74 are provided with hooks which engage ring elements 82, 84 provided, respectively, on the ski nose 22 and the bracket 76. The function of the spring 74 is to maintain the nose 22 in elevated attitude, about 16 or 17 inches from the ground, in order to prevent digging or diving of the ski into snow and to prevent snow from piling up under the understructure around the vehicle wheels which might prevent satisfactory movement of the various spring structures. The spring 74 also limits the turning radius of the vehicle by increasing the back tension on the vehicle steering system. Therefore, the driver cannot turn the skis too far. If the skis were turned too far, they would assume a broaching position with respect to the snow which would lead to destruction of the ski structures.

A coil tension spring 86, 88 is provided on each side of the rim 16. The springs 86, 88 are hooked at one end through openings provided in the rim flanges. The other ends of the springs 86, 88 are hooked through openings provided in the upper edge portions of sidewalls 90, 92. The springs 86, 88 are stabilizer springs and are provided to resist side-rolling of the ski structure. The initial resistance to rolling of the springs is small but rises rapidly as the springs are extended. Thus a controlled amount of roll is permitted.

A caster 94 is provided on the underside of the ski beneath the support 28. The caster 94 is not pivotable. A second caster 96 (FIG. 1) is provided on the underside of the ski near the rear of the ski. The caster 96 is pivotable and is used for steering. These casters are to permit movement of the skis over a non-slippery surface as, for example, a driveway to park the vehicle. The provision of a fixed front caster and pivotable rear caster aids in steering, making steering on dry pavement easier and more stable than would be the case if the front caster were also pivotable.

Another embodiment of the ski structure is illustrated in FIGS. 4 and 5. The ski structure 98 is inflatable. It is fabricated of a flexible material such as rubber-impregnated fabric or re-inforced elastomeric sheet. The lower portion is configured in the general shape of a ski, having an elongated relatively broad ground engaging portion 100 and an upturned nose 102. As will be noted in FIG. 5, the ski structure is compartmentalized, there being five separate compartments 104, 106, 108, 110, 112. Each of these compartments is inflatable through a separate valve, valve structures 114, 116, 118, 120 being visible in FIG. 4, the fifth valve structure being hidden from view behind the wheel rim 122. As a consequence, the pressure in each of the compartments may be varied to the desired level to control such things as height of the wheel rim 122 from the ground, stiffness of spring resistance vertically and sideways to thereby control the roll characteristics, bounce characteristics, balance and the like.

As will be noted in FIG. 5, the main body of the ski structure has a generally triangular configuration in cross-section. Three elongated compartments 108, 110, 112 are provided in the bottom portions. A single elongated compartment 106 is provided directly above the lower compartments. The fifth compartment 104 is defined by the upper portion of the ski body which is configured in the general shape of a tubeless tire, having annular outer wall 123 and annular sidewalls 124, 126 which terminate in bead portions 128, 130 which nestle in the flanges 132, 134 of the wheel rim 122 in the manner of a tubeless tire to define with the wheel rim a closed compartment which may be inflated by the usual valve 120. As will be noted in FIG. 4, the wall structure defining the compartment 104 extends all the way around the wheel rim 122 to fully attach and seal the ski structure to the wheel. The wheel is then mounted directly on the front axle hub of a vehicle in the same manner as a regular wheel is mounted thereon by use of the wheel lugs.

An elongated anti-friction, abrasion resistent steel runner 136 is molded to the underside of the ski structure.

The runner 136 extends for the full length of the ski. Elongated carbide runner elements 138, 140 are illustratively provided on the outer marginal edges of the runner 136 to provide for a two point contact with the ground surface. However, the runner 136 will function without provision of the runner elements 138, 140.

A reinforcing plate 142 is provided on the upper forward end surface of the nose 102. A ring element 144 is attached to the plate 142 to permit hooking on of an elongated coil tension spring 146 which is attached to the vehicle in the same manner and for the same purpose as is spring 44 in the FIG. 1 embodiment. Side stabilizer springs are not necessary in connection with the FIG. 4 embodiment because the compartments serve the same function, particularly the compartments 108, 112.

A modified version of the inflatable ski structure is shown in FIG. 6. As there shown, the inflatable ski structure 146 is shown in cross-section only as its overall exterior configuration is the same as that shown in FIG. 4. The ski structure 146 has three elongated compartments 143, 145, 147 with the side compartments 143, 147 being of larger volume than the center compartment 145. Again, each of the compartments is inflatable through a separate valve, the valve for the center compartment 145 not being shown. The side compartments 143, 147 function in the manner of the stabilizer springs of the FIG. 1 embodiment as described in connection with the FIG. 4 embodiment.

The central portion of the elongated center compartment 145 does not have an upper wall. Instead, a new or used treadless tire 148 is received in the well defined by sidewall portion 150, 152. The tire 148 is vulcanized to these sidewalls to be integrated into the ski structure. The tire 148 may then be mounted on a vehicle wheel rim 154 in the usual fashion and then secured to the hub of the front vehicle axle in the usual manner.

FIGS. 7 and 8 illustrate another embodiment of a ski structure 156. The ski portion 158 is a molded plastic element. It comprises elongated side runners 160, 162 with a raised and curved elongated central portion 164 which allows snow to traverse thereunder. An upturned nose portion 163 is provided at the front end. A ring 165 and coil tension spring 167 are provided on the nose 163 for use as previously described. The rear section 166 is curved upwardly and forwardly to permit rearward movement of the ski without digging into the snow. A central well 168 is provided to receive a standard vehicle tire and wheel assembly 170.

A hinged wheel retainer structure is provided to secure the wheel assembly 170 to the ski structure 158 within the well 168. As will be noted, the retainer structure comprises a first curved section 172 which is pivotally attached at 174 to the well structure. A second curved section 176 is hinged at 178 to the first section 172. The second section 176 extends almost to the other side of the well.

As shown in FIG. 8, an adjustable toggle latch structure is provided to releasably secure the end 182 of the section 176 to upstanding portion 184 of the well 168. The toggle latch includes a threaded member 186 which is pivotally connected at one end to bracket 187 and threadingly received at the other end in a threaded opening provided in latch member 188. The latch member 188 may be turned on the member 186 to adjust the overall length of the latch. The hooked end 192 of the latch structure is releasably received in a slot 194 provided in plate 196 which is secured to the portion 184. Pivotable lever 198 permits engagement and disengagement of the latch with the slot. A ring 200 extends from member 188 through a slot in lever 198. A pin 202 is received in the ring 200 to releasably lock the latch in the engaged position.

What we claim as our invention is:

1. A ski construction for a vehicle comprising a ground engageable ski element, said ski element comprising a gas-inflatable unit having flexible resilient walls, said ski element including means for attachment to an axle hub of a vehicle, said ski element including an upturned forward nose portion.

2. A ski construction as defined in claim 1, further characterized in the provisions of a tension spring secured at one end to said nose portion and means for securing the other end of said spring to structure of a vehicle at a position above the ski element to apply a vertical force to said nose portion to maintain said nose portion in an upwardly directed attitude and also to inhibit the turning radius of the vehicle steering system.

3. A ski construction as defined in claim 1, further characterized in that said inflatable unit comprises at least two separate compartments extending longitudinally, said inflatable unit including separate valve structures for each compartment for separate inflation of the compartments.

4. A ski construction as defined in claim 3, further characterized in the provision of an elongated longitudinally extending additional compartment between said two compartments, and separate valve means for separate inflation of said additional central compartment.

5. A ski construction as defined in claim 4, further characterized in the provision of a fourth compartment above said three compartments, said fourth compartment extending longitudinally of the ski element.

6. A ski construction as defined in claim 3, further characterized in the provision of a tire-like element provided on said ski element above said compartments, said tire-like element being receivable on a vehicle wheel rim, and valve means for separately inflating said tire-like element for sealing engagement with the vehicle wheel rim in the conventional manner.

7. A ski construction as defined in claim 6, further characterized in that said inflatable unit is fabricated of an elastomeric vulcanizable material, said tire-like element being a vehicle tire vulcanized to the inflatable unit.

8. A ski construction as defined in claim 1, further characterized in the provision of a metallic runner secured to the bottom of the inflatable unit and extending longitudinally thereof.

9. A ski construction as defined in claim 8, further characterized in the provision of downwardly protruding, longitudinally extending spaced apart strips on the underside of said runner element to define the ground engaging portion of the runner.

\* \* \* \* \*